US008995395B2

(12) United States Patent
Frenne et al.

(10) Patent No.: US 8,995,395 B2
(45) Date of Patent: Mar. 31, 2015

(54) NETWORK NODE, USER EQUIPMENT AND METHODS THEREIN FOR RANDOM ACCESS HANDLING

(75) Inventors: Mattias Frenne, Uppsala (SE); Robert Baldemair, Solna (SE); Jung-Fu Cheng, Fremont, CA (US); Daniel Larsson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 56 days.

(21) Appl. No.: 13/581,109

(22) PCT Filed: May 9, 2012

(86) PCT No.: PCT/SE2012/050493
§ 371 (c)(1),
(2), (4) Date: Aug. 24, 2012

(87) PCT Pub. No.: WO2013/169154
PCT Pub. Date: Nov. 14, 2013

(65) Prior Publication Data
US 2013/0301608 A1 Nov. 14, 2013

(51) Int. Cl.
H04W 4/00 (2009.01)
H04W 72/04 (2009.01)
H04W 74/08 (2009.01)

(52) U.S. Cl.
CPC .......... *H04W 72/04* (2013.01); *H04W 74/0833* (2013.01); *H04W 72/0406* (2013.01)
USPC .......................................... 370/331; 370/341

(58) Field of Classification Search
CPC ............ H04W 72/04; H04W 72/0406; H04W 74/0833
See application file for complete search history.

(56) References Cited

U.S. PATENT DOCUMENTS

| 2011/0151875 | A1* | 6/2011 | Park et al. ...................... 455/436 |
| 2011/0183663 | A1* | 7/2011 | Kenehan et al. ............... 455/423 |
| 2011/0249633 | A1 | 10/2011 | Hong et al. |
| 2011/0250913 | A1 | 10/2011 | Vajapeyam et al. |
| 2013/0301542 | A1* | 11/2013 | Krishnamurthy et al. ..... 370/329 |
| 2013/0301597 | A1* | 11/2013 | Kim et al. ...................... 370/329 |

FOREIGN PATENT DOCUMENTS

| EP | 2214445 A1 | 8/2010 |
| KR | 20100091873 A | 8/2010 |

OTHER PUBLICATIONS

3rd Generation Partnership Project. "PDCCH Enhancement in Rel-11." 3GPP TSG RAN WG1 Meeting #66,R1-112421, Aug. 22-26, 2011, pp. 1-6, Athens, Greece.
3rd Generation Partnership Project. "On enhanced PDCCH design." 3GPP TSG-RAN WG1 #66bis, R1-112928, Oct. 10-14, 2011, pp. 1-3, Zhuhai, China.

\* cited by examiner

*Primary Examiner* — Kibrom T Hailu
(74) *Attorney, Agent, or Firm* — Murphy, Bilak & Homiller, PLLC

(57) ABSTRACT

A method in a User Equipment (150), UE, for handling random access procedure to a wireless communications network via a network node (140), the UE (150) being configured to support transmissions on a Control CHannel, CCH, on an enhanced Control CHannel, eCCH, or on both. The method comprises sending (S160) a random access preamble to the network node, and receiving (S162) a random access response from the network node on at least one of the CCH or the eCCH. The random access preamble comprising a UE indication indicating that the UE is configured to monitor transmissions on the CCH, on the eCCH or on both;
A user equipment, a method in network node and a network node are also provided.

36 Claims, 11 Drawing Sheets

NETWORK NODE, USER EQUIPMENT AND METHODS THEREIN FOR RANDOM ACCESS HANDLING

TECHNICAL FIELD

Embodiments herein relate to a network node, a user equipment and methods therein. In particular, embodiments herein relate to handling of random access procedure(s) in a wireless communications network supporting both Control CHannel (CCH) and enhanced Control CHannel (eCCH) transmissions.

BACKGROUND

In a typical cellular radio system, wireless terminals, also known as mobile stations and/or user equipments (UEs), communicate via a radio access network (RAN) to one or more core networks. The radio access network covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site.

3GPP Long Term Evolution (LTE) uses Orthogonal Frequency Division Multiplexing (OFDM) in the downlink (DL) and Discrete Fourier Transform (DFT)-spread OFDM in the uplink (UL). The basic LTE downlink physical resource may thus be seen as a time-frequency grid as generally illustrated in FIG. 1, where each resource element corresponds to one OFDM subcarrier during one OFDM symbol interval.

In the time domain, LTE downlink transmissions are organized into radio frames of 10 ms, each radio frame consisting of ten equally-sized sub-frames of length $T_{sub-frame}$=1 ms, as generally illustrated in FIG. 2.

Furthermore, the resource allocation in LTE is typically described in terms of resource blocks, where a resource block corresponds to one slot (0.5 ms) in the time domain and 12 contiguous subcarriers in the frequency domain (see FIG. 1). Resource blocks are numbered in the frequency domain, starting with 0 from one end of the system bandwidth.

The notion of Virtual Resource Blocks (VRB) and Physical Resource Blocks (PRB) has been introduced in LTE. The actual resource allocation to a UE is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain, thereby providing frequency diversity for data channel transmitted using these distributed VRBs.

Downlink transmissions are dynamically scheduled, e.g., in each sub-frame the base station transmits control information about to which user equipments data is transmitted and upon which resource blocks the data is transmitted, in the current downlink sub-frame. This control signalling is typically transmitted in the first 1, 2, 3 or 4 OFDM symbols in each sub-frame and the number n=1, 2, 3 or 4 is known as the Control Format Indicator (CFI) indicated by the Physical CFI Channel (PCHICH) transmitted in the first symbol of the control region. The control region also contains Physical Downlink Control Channels (PDCCH) and possibly also Physical Hybrid-Automatic Repeat Request (HARQ) Indication Channels (PHICH) carrying Acknowledgement/Non-Acknowledgement (ACK/NACK) for the UL transmission.

The downlink sub-frame also contains Common Reference Symbols (CRS), which are known to the receiver and used for coherent demodulation of e.g. the control information. A downlink system with 1 out of 3 OFDM symbols as control is generally illustrated in FIG. 3.

In order to preserve the orthogonality in UL the UL transmissions from multiple UEs the UEs need to be time aligned at the eNodeB. Since UEs may be located in a served cell at different distances from the eNodeB, see FIG. 4, the UEs will need to initiate their UL transmissions at different times. A UE far from the eNodeB needs to start transmission earlier than a UE close to the eNodeB. This can for example be handled by time advance of the UL transmissions, a UE starts its UL transmission before a nominal time given by the timing of the DL signal received by the UE. This concept is illustrated in FIG. 5.

The UL Timing Advance (TA) is maintained by the eNodeB through timing advance commands to the UE based on measurements on UL transmissions from that UE.

Through timing advance commands, the UE is ordered to start its UL transmissions earlier or later. This applies to all UL transmissions except for random access preamble transmissions on Physical Random Access Control Channel (PRACH), i.e. including transmissions on Physical Uplink Shared Channel (PUSCH), Physical Uplink Control Channel (PUCCH), and Sounding Reference Signal (SRS).

There is a strict relation between DL transmissions and the corresponding UL transmission. Examples of this are:
 the timing between a Downlink Shared Channel (DL-SCH) transmission on Physical Downlink Shared Channel (PDSCH) to the HARQ ACK/NACK feedback transmitted in UL (either on PUCCH or PUSCH);
 the timing between an UL grant transmission on Physical Downlink Control Channel (PDCCH) or enhanced PDCCH (ePDCCH), also sometimes denoted evolved PDCCH, to the UL-SCH transmission on PUSCH.

By increasing the timing advance value for a UE, the UE processing time between the DL transmission and the corresponding UL transmission decreases. For this reason, an upper limit on the maximum timing advance has been defined by 3GPP in order to set a lower limit on the processing time available for a UE. For LTE, this value has been set to roughly 667 us which corresponds to a cell range of 100 km. Note that the TA value compensates for the round trip delay.

In LTE Rel-10 there is only a single timing advance value per UE and all UL cells are assumed to have the same transmission timing. The reference point for the timing advance is the received timing of the primary DL cell.

In LTE Rel-11 different serving cells used by the same UE may have different Timing Advance (TA) values. Most likely the serving cells sharing the same TA value (for example depending on the deployment) will be configured by the network to belong to a so called TA group. If at least one serving cell of the TA group is time aligned, all serving cells belonging to the same group may use this TA value. To obtain time alignment for a Secondary Cell (SCell) belonging to a different TA group than the Primary Cell (PCell), the current 3GPP assumption is that network initiated random access (RA) may be used to obtain initial TA for this SCell (and for the TA group the SCell belongs to).

In LTE, as in any communication system, a UE (mobile terminal) may need to contact the network, via the eNodeB, without having a dedicated resource in the Uplink (from UE to base station i.e. eNodeB in this example). To handle this contact, a Random Access (RA) procedure is available where a UE that does not have a dedicated UL resource may transmit a signal to the eNodeB. The first message of this procedure is typically transmitted on a special resource (channel) reserved for RA i.e. a PRACH. This channel can for instance be limited in time and/or frequency (as in LTE). See FIG. 6 explaining the PRACH implementation in available radio block resources.

The resources available for PRACH transmission is provided to the terminals as part of the broadcasted system information in system information block 2 (SIB-2) (or as part of dedicated Radio Resource Control (RRC) signalling in case of e.g. handover).

The resources consist of a preamble sequence and a time/frequency resource. In each cell, there are 64 preamble sequences available. Two subsets of the 64 sequences are defined, where the set of sequences in each subset is signalled as part of the system information. When performing a (contention-based) random-access attempt, the terminal selects at random one sequence in one of the subsets. As long as no other terminal is performing a random-access attempt using the same sequence at the same time instant, no collisions will occur and the attempt will, with a high likelihood, be detected by the eNodeB.

In LTE, the random access procedure can be used for a number of different reasons. Among these reasons are:
 Initial access (for UEs in the RRC_IDLE state).
 Incoming handover.
 Resynchronization of the UL.
 Scheduling request (for a UE that is not allocated any other resource for contacting the base station).
 Positioning.

The contention-based random access procedure used in LTE Rel-10 is illustrated in FIG. 7. The UE starts the random access procedure by randomly selecting one of the preambles available for contention-based random access. The UE then transmits the selected random access preamble on the PRACH to eNodeB in the LTE RAN.

The RAN acknowledges any preamble it detects by transmitting a random access response (MSG2) including an initial grant to be used on the uplink shared channel, a Temporary Cell Radio Network Temporary Identifier (TC-RNTI), and a time alignment update based on the timing offset of the preamble measured by the eNodeB on the PRACH. The MSG2, i.e. the RAR, is transmitted in the DL to the UE using the PDSCH, and its corresponding PDCCH message that schedules the PDSCH contains a Cyclic Redundancy Check (CRC) which is scrambled with the RA-RNTI.

When receiving the response the UE uses the grant to transmit a message (MSG3) that in part is used to trigger the establishment of radio resource control and in part to uniquely identify the UE on the common channels of the cell. The timing alignment command provided in the RAR is applied in the UL transmission in MSG3.

In addition, the eNB can also change the resources blocks that are assigned for a MSG3 transmission by sending an UL grant that has its CRC scrambled with the TC-RNTI which was included in MSG2. In this case the PDCCH is used, to transmit the Downlink Control Information (DCI) containing the uplink grant.

The MSG4 which is then contention resolving has its PDCCH CRC scrambled with the C-RNTI if the UE previously has a C-RNTI assigned. If the UE does not have a C-RNTI previously assigned, then the UE will have its PDCCH CRC scrambled with the TC-RNTI obtained from MSG2. In the first case it is considered that the UE has included its C-RNTI into the MSG3 message whereas in the latter case the UE has included a core network identifier into the MSG3 message.

The procedure of FIG. 7 ends with the RAN solving any preamble contention that may have occurred for the case that multiple UEs transmitted the same preamble at the same time. This can occur since in contention based RA each UE randomly selects when to transmit and which preamble to use. If multiple UEs select the same preamble for the transmission on RACH, there will be contention between these UEs that needs to be resolved through the contention resolution message (MSG4). The case when contention occurs is illustrated in FIG. 8, where two UEs transmit the same preamble, p5, at the same time. A third UE also transmits at the same RACH, but since it transmits with a different preamble, p1, there is no contention between this UE and the other two UEs.

The UE may also perform non-contention based RA. A non-contention based RA or contention free RA can e.g. be initiated by the eNodeB to get the UE to achieve synchronisation in UL. The eNodeB initiates a non-contention based RA either by sending a PDCCH order or indicating it in an RRC message. The later of the two is used in case of Handover (HO).

The eNodeB can also order the UE, through a PDCCH message, to perform a contention based random access. The procedure for this is illustrated in FIG. 7. The RA order may illustrate a first step of a procedure for the UE to perform contention free random access. Similar to the contention based random access the MSG2 is transmitted in the DL to the UE and its corresponding PDCCH message CRC is scrambled with the RA-RNTI. The UE considers the contention resolution successfully completed after it has received MSG2 successfully.

For the contention free random access as for the contention based random access does the MSG2 contain a timing alignment value. This enables the eNodeB to set the initial/updated timing according to the UEs transmitted preamble.

Following is an explanation of the PDCCH monitoring procedure. A UE monitors a common search space and a UE specific search space in the PDCCH. In each search space, a limited number of candidates or equivalently PDCCH transmission hypothesis is checked, in every DL sub-frame. These are known as blind decodes, and the UE checks whether any of the transmitted DCI messages is intended for it.

The UE monitors the following RNTI that are associated with the random access and paging procedures for each associated search spaces on PDCCH:
 the RA-RNTI for MSG2 is monitored in the common search space
 the TC-RNTI for MSG3 is monitored in the common search space, for reallocating the MSG3 in frequency.
 the TC-RNTI for MSG4 is monitored in the common search and UE specific TC-RNTI search space
 the C-RNTI for MSG4 is monitored in the common search and UE specific C-RNTI search space.
 The P-RNTI is monitored is monitored in the common search space.

In LTE 3GPP Rel.11 discussions an enhanced PDCCH (ePDCCH) is introduced which is based on UE specific reference signals and is localized in frequency as opposed to the PDCCH which spans the whole bandwidth. Hence, a subset of the available RB pairs in a sub-frame is configured to be used for ePDCCH transmissions.

The use of UE specific precoding means that precoding gains can be achieved also for the control channels. Another benefit is that different RB pairs for ePDCCH can be allocated to different cells or different points within a cell. Thereby, Inter-Cell Interference Coordination (ICIC) between control channels may be achieved. This frequency coordination is not possible with the PDCCH since the PDCCH spans the whole bandwidth.

FIG. 9 shows an ePDCCH which, similarly to the Control Channel Element (CCE) in the PDCCH, which is divided into multiple enhanced REGs (eREGs) and enhanced CCE (eCCE) and which are mapped to one of the enhanced control regions i.e. mapped to one of the enhanced control regions/PRB pair reserved for ePDCCH transmission, to achieve localized transmission. For PDCCH, one CCE corresponds to 36 Resource Elements (RE) divided into 9 RE groups (REGs). However, the relation between eCCE and eREGs and REs is not really decided for yet in 3GPP. One proposal is that the relation between eCCE and eREGs/REs is to have them similar as for PDCCH i.e. one eCCE corresponds to 36 REs divided into 9 eREGs each comprising 4 REs that is. Another proposal is to have one eCCE corresponding to up to 36 REs and wherein each eREG corresponds to 18 REs. 3GPP may also decide that the eCCE should correspond to even more than 36 REs such as 72 or 74.

Even if the enhanced control channel enables UE specific precoding and such localized transmission as illustrated in FIG. 9, it may in some cases be useful to be able to transmit an Enhanced Control Channel (ECC) in a broadcasted, wide area coverage fashion. This is useful if the eNodeB, also sometimes denoted eNB, does not have reliable information to perform precoding towards a certain UE. Then a wide area coverage transmission is more robust, although the precoding gain is lost. Another case is when the particular control message is intended for more than one UE. In this case, UE-specific precoding can not be used. An example is the transmission of common control information as in the PDCCH (i.e. in the common search space).

In yet another case, sub-band precoding may be utilized. Since the UE estimates the channel in each RB pair individually, the eNodeB can choose different precoding vectors in the different RB pairs, if the eNodeB has such information that the preferred precoding vectors are different in different parts of the frequency band. In any of these cases, a distributed transmission may be used. FIG. 10 illustrates how eREGs belonging to the same ePDCCH are distributed over the enhanced control regions.

A UE may be configured to monitor its control channel in the ePDCCH instead of the PDCCH. Hence, both its UE-specific Search Space (USS) and its Common Search Space (CSS) are monitored in the ePDCCH resources. Alternatively, a UE may monitor the USS in the ePDCCH and the CSS in the PDCCH.

For some UE categories in the future, such as low cost Machine Type Communication (MTC) UEs, they don't monitor the PDCCH at all. One reason could be that they have a reduced and UE specific reception bandwidth and cannot receive the full system bandwidth, which is required to monitor the PDCCH. Therefore, these UEs must always monitor CSS and USS in the ePDCCH.

For at least these UEs, initial access to a cell must also be performed directly to ePDCCH. Also, UEs that are capable of monitoring either or both of PDCCH and ePDCCH may choose to perform initial access using the ePDCCH if it is available in the cell. An example given here may be wherein a UE1 and a UE2 are synchronized to an eNodeB and wherein UE1 is configured to monitor the CSS in PDCCH while UE2 is configured to monitor the CSS in ePDCCH. Under some circumstances that are discussed here below, the eNodeB is unaware of which channel a given UE is monitoring and this is a problem.

Such circumstances are when a UE:
Access the network initially, or
is performing a contention based random access to provide sync at hand over to a new cell, or
performing a contention based random access to perform scheduling request if no scheduling request resource has been assigned then the network can not distinguish whether the UE monitors the control channel, and particularly the CSS, in ePDCCH or the PDCCH since
legacy UEs only monitor the RA-RNTI for MSG2 in CSS in the PDCCH.
Rel-11 and beyond UEs may monitor the RA-RNTI for MSG2 in CSS in the ePDCCH.

Hence when transmitting RACH MSG2 or a re-scheduling of RACH MSG3, the network does not know if PDCCH or ePDCCH should be used to communicate with the UE. It is therefore a problem how to communicate with a UE in this case.

Thus, there are problems of how to communicate with UEs in the wireless communications network and how to maintain/provide backward compatibility to be able to serve UEs of older versions.

SUMMARY

It is an object of embodiments herein to provide a way of handling random access procedures for UEs supporting different wireless communications networks/systems/technologies and wherein backward compatibility in a wireless communications network is maintained.

According to a first aspect of embodiments herein, the object is achieved by a method in a network node for handling of random access procedure(s) providing access to User Equipments (UEs) to a wireless communications network via the network node. The network node supporting both transmissions on a control channel (CCH) and on an enhanced control channel (eCCH). The method comprises receiving a random access preamble (MSG1) from at least one UE in the wireless communications network, the random access preamble comprising a UE indication indicating whether the at least one UE is configured to monitor transmissions on the CCH, on the eCCH or on both. The method also comprises, transmitting (MSG2) a random access response to the UE on at least one of the CCH or the eCCH enabling the UE to monitor the transmissions.

According to a second aspect of embodiments herein, the object is achieved by a network node for handling of random access procedure(s) providing access to UEs to a wireless communications network via the network node. The network node being configured to support transmissions both on a CCH and on an eCCH. Also, the network node comprises a transceiver circuitry configured to receive a random access preamble (MSG1) from at least one UE in the wireless communications network, and transmit a random access response to the UE on at least one of the CCH or the eCCH enabling the UE to monitor the transmissions. The random access preamble comprises a UE indication indicating whether the at least one UE is configured to monitor transmissions on the CCH, on the eCCH or on both.

According to a third aspect of embodiments herein, the object is achieved by a method in a UE for handling random access procedure to a wireless communications network via a network node. The UE being configured to support transmissions on a CCH, on an eCCH, or on both. The method comprises sending a random access preamble to the network node, the random access preamble comprising a UE indication indicating that the UE is configured to monitor transmissions on the CCH, on the eCCH or on both. The method also comprises receiving a random access response from the network node on at least one of the CCH or the eCCH enabling the UE to monitor the transmissions.

According to a fourth aspect of embodiments herein, the object is achieved by a UE configured for handling a random access procedure to a wireless communications network via a network node. The UE being further configured to support transmissions on a CCH, on an eCCH, or on both. The UE comprises a UE transceiver circuitry configured to send a random access preamble to the network node, and receive a random access response from the network on at least one of the CCH or the eCCH enabling the UE to monitor the transmissions from the network node. The random access preamble comprises an UE indication indicating that the UE is configured to monitor transmissions on the CCH, on the eCCH or on both.

Embodiments/aspects described herein provide advantages, such as reduced control signalling overhead since a UE may be reach without having to repeat a random access procedure several times. Also preamble capacity is optimised without a need of reserving special preamble sets for different systems/networks (PDCCH and ePDCCH) i.e. monitoring UEs respectively.

Additionally, according to the aspects and embodiments mentioned above, backward compatibility is maintained due to use of the UE indication to determine the capabilities of the UE and thereby adjust the transmissions on the control channels supported.

Other objectives, advantages and novel features of aspects of the present disclosure/embodiments will become apparent from the following detailed description of embodiments and aspects.

BRIEF DESCRIPTION OF THE DRAWINGS

The foregoing and other objects, features, and advantages of the technology disclosed herein will be apparent from the following more particular description of preferred embodiments as illustrated in the accompanying drawings. The drawings are not necessarily to scale, emphasis instead being placed upon illustrating the principles of the technology disclosed herein.

DETAILED DESCRIPTION

Figure 1:
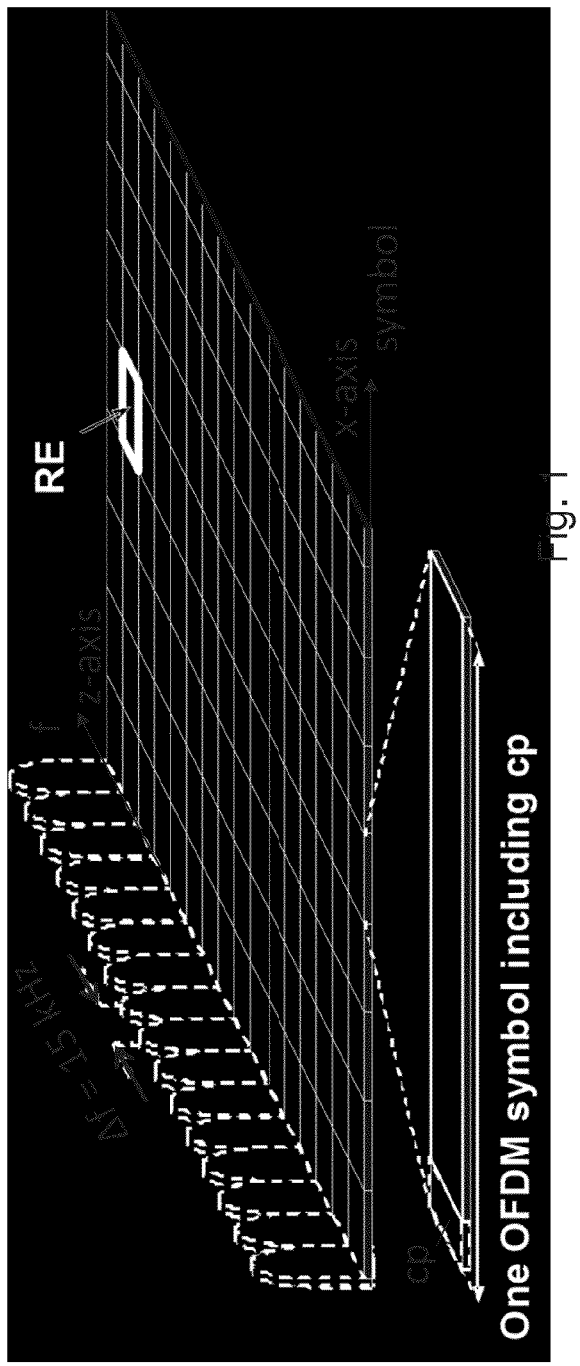
FIG. 1 is a diagrammatic view illustrating, e.g., LTE downlink physical resources.
Figure 2:
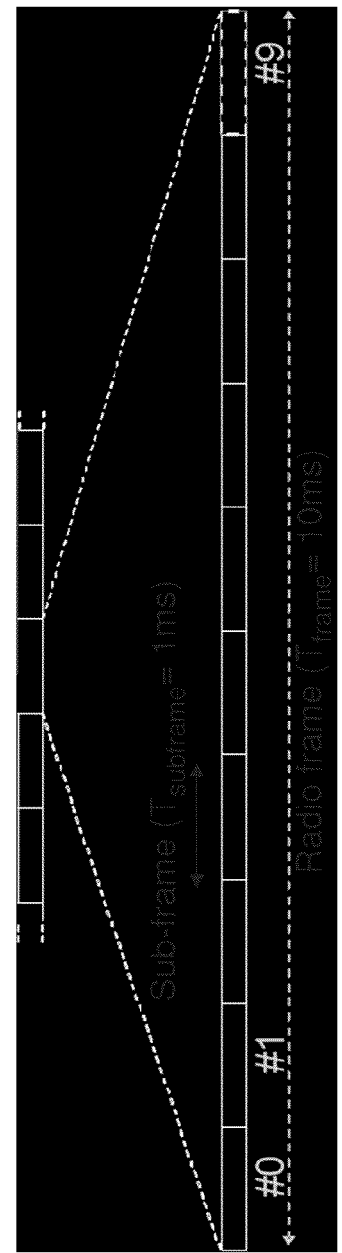
FIG. 2 is a diagrammatic view illustrating, e.g., LTE time-domain structure.
Figure 3:
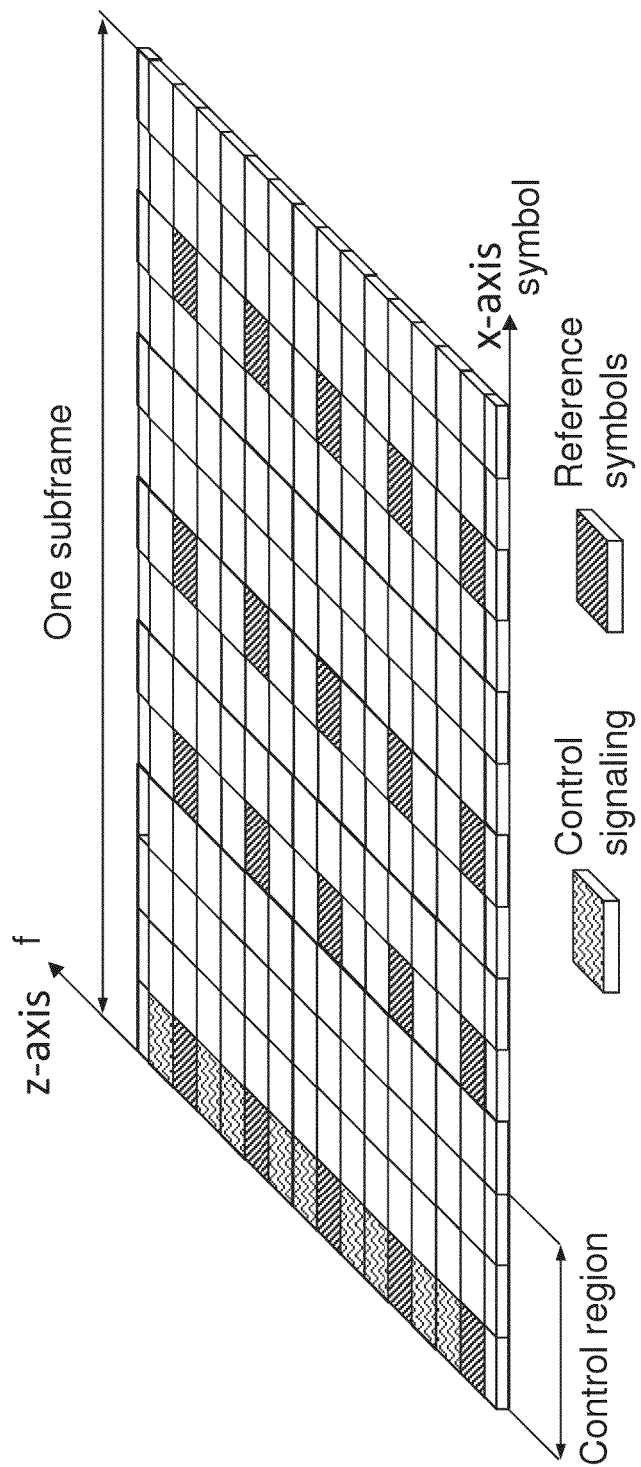
FIG. 3 is a diagrammatic view illustrating, e.g., a Downlink sub-frame.
Figure 4:
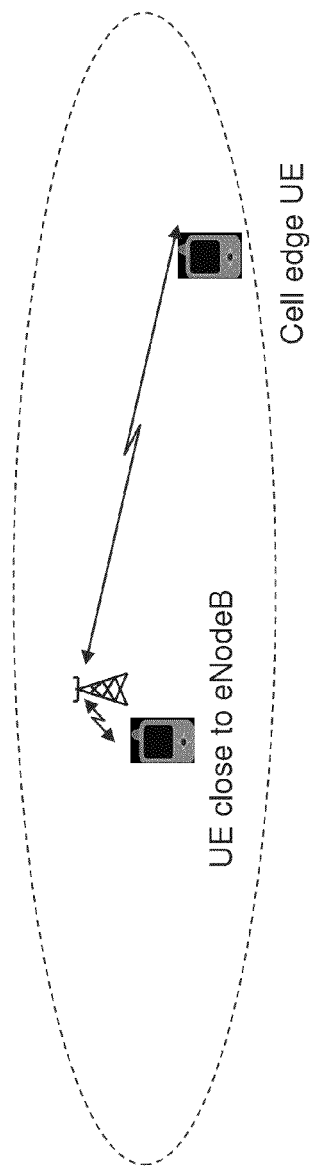
FIG. 4 is a scheme illustrating a cell with two UEs at different locations from the network node (eNodeB).
Figure 5:
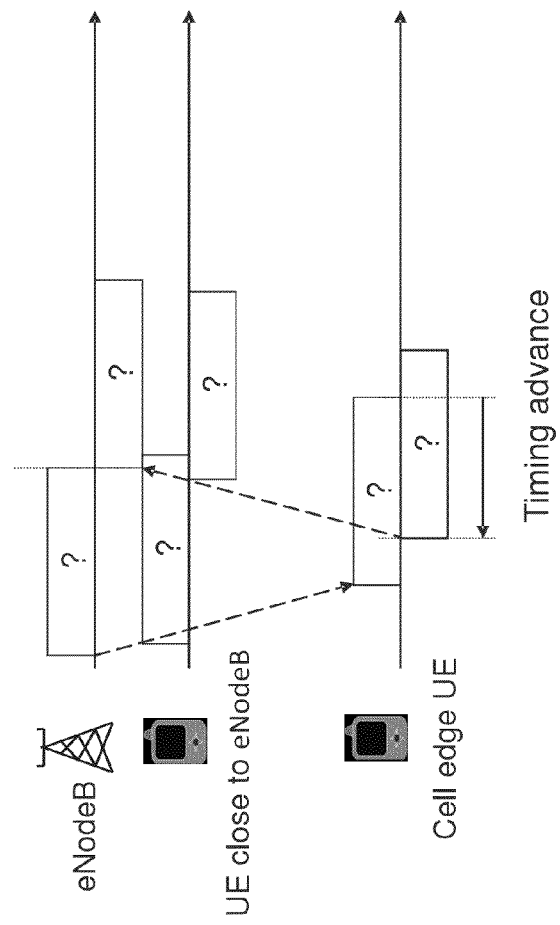
FIG. 5 is an example illustration of the timing advance procedure for uplink transmissions depending on UE distance to network node (eNodeB) e.g. for LTE.
Figure 6:
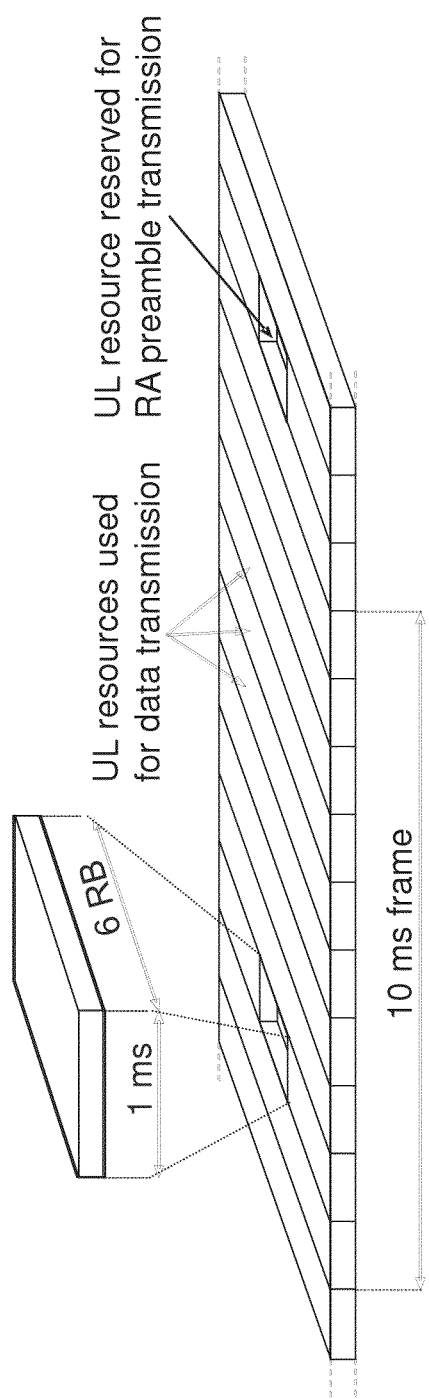
FIG. 6 is a principal illustration of random access preamble transmission in for example LTE.
Figure 7:
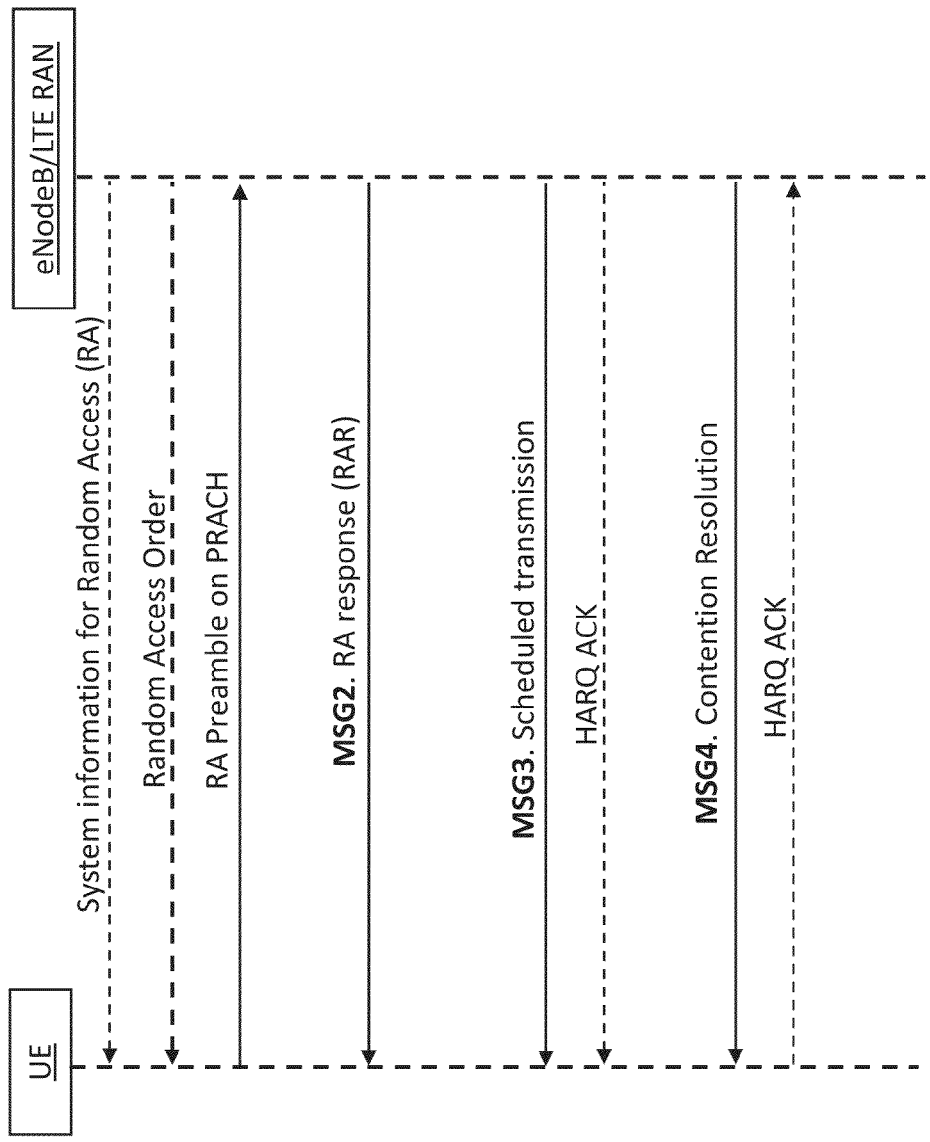
FIG. 7 is an illustration of a signalling scheme for the contention-based random access procedure e.g. in LTE.
Figure 8:
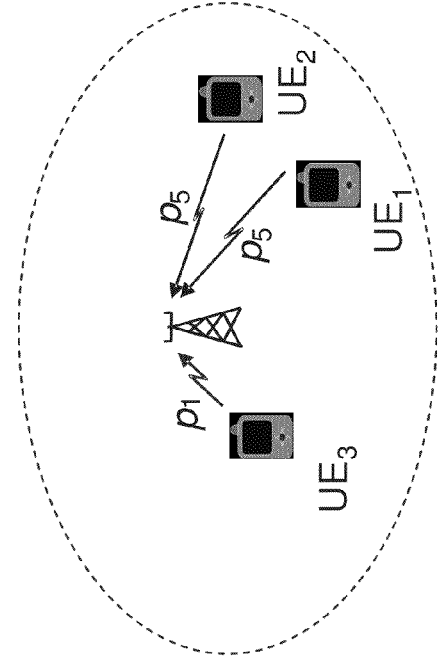
FIG. 8 is a scheme illustrating contention based random access wherein there is contention between two UEs.
Figure 9:
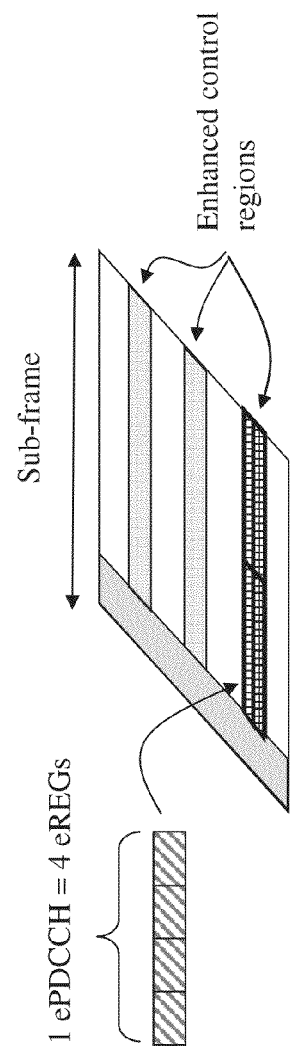
FIG. 9 is an example illustration of mapping of an eCCE belonging to an ePDCCH and which is mapped to one of the enhanced control regions/RB pairs.
Figure 10:
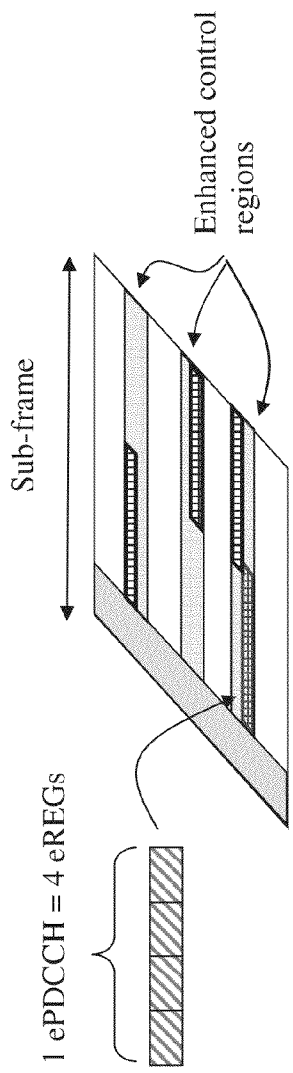
FIG. 10 is an example illustration of mapping of an eCCE belonging to an ePDCCH and which is mapped to multiple enhanced control regions/RB pairs.

The figures are schematic and simplified for clarity, and they merely show details which are considered necessary to an understanding of embodiments or aspects, while other details have been left out. Throughout, the same reference numerals are used for identical or corresponding parts, steps or actions.

As already mentioned earlier, when transmitting RACH MSG2 or a re-scheduling of RACH MSG3, the wireless communications network does not know if CCH (PDCCH) or eCCH (ePDCCH) should be used to communicate with UE(s). It is therefore desirable to have procedure(s) for handling random access for different UEs with different capabilities.

Figure 13:
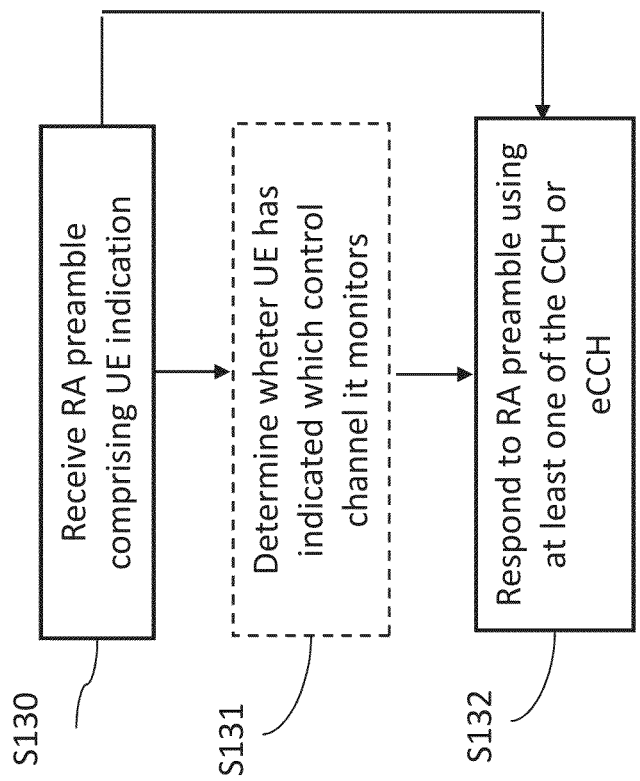
FIG. 13 is a flowchart showing basic acts or steps of an exemplary random access procedure from a network node perspective.

FIG. 13 is flow chart showing basic acts or steps of an exemplary random access procedure from a network node perspective. According to FIG. 13 method steps/acts (not necessarily in the chronological order showed) in a network node for handling of random access procedure(s) providing access to UEs to a wireless communications network via the network node, are illustrated. The network node is being configured to support both transmissions on a CCH and on an enhanced control channel eCCH. The network node will be disclosed in more details further below.

Referring back to FIG. 13, the method comprises a step/act of receiving S130 a Random Access (RA) preamble from at least one UE in the wireless communications network. The random access preamble, which may be part of a message such as the MSG1, may be received on a PRACH or on any other similar channel. One UE is given as an example here for reason of simplicity. The RA preamble may be comprise in a message (MSG1) and may in turn itself comprise a UE indication indicating that/whether the at least one UE is configured to monitor transmissions on the CCH (e.g. PDCCH), on the eCCH (e.g. ePDCCH) or on both. The method also comprises, transmitting S132 a response to the received RA preamble, i.e. a random access response, on (or using) at least one of the CCH or the eCCH enabling the UE to monitor transmissions from the network node (eNodeB, eNB, BS etc). The transmissions may be as mentioned before control information sent on a any of the control channels CCH or eCCH.

According to one embodiment the network node may be configured/pre-configured to always respond by transmitting on both the CCH and the eCCH. Transmitting on both control channels is done to ensure that all UEs in a served cell are reached. As an example, a PDSCH containing RACH MSG2 is scheduled at a same time on/using a PDCCH and an ePDCCH control channel transmission. Hence, both the PDCCH and the ePDCCH Downlink Control Information (DCI) messages schedule the same PDSCH transmission in the subframe. In this way a UE may receive MSG2 irrespectively of whether it is monitoring the RA-RNTI in PDCCH or ePDCCH. The used RA-RNTI of the DCI message when MSG2 is scheduled by the ePDCCH may however be different than the RA-RNTI of the DCI message used when MSG2 is scheduled by the PDCCH. This is more illustrated by FIG. 11.

Figure 11:
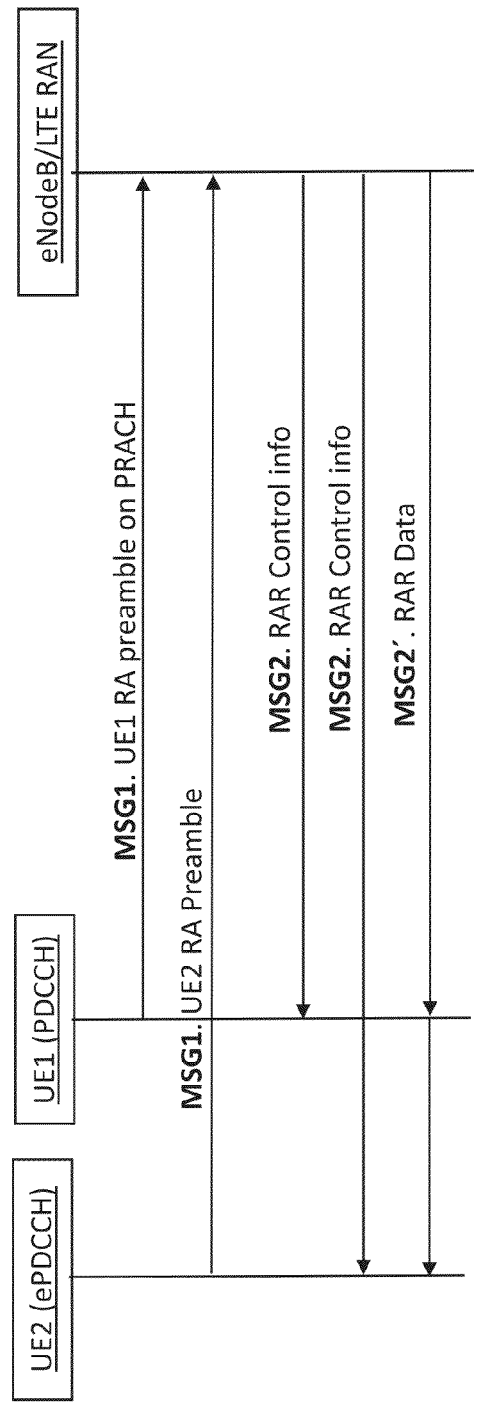
FIG. 11 is an illustration of a signalling scheme for random access procedure according to example embodiments and aspects.

Following above, FIG. 11 is an illustration of a signalling scheme for random access procedure, contention based RA procedure, according to example embodiments and aspects. The signalling scheme is used as an example illustrating a network node receiving a UE random access preamble (MSG1), e.g. as part of a message/signalling sent from UE to the network node. The UE is located in a served cell i.e. cell served by the network node, or served cells. There may also be more than one UE (UE1; UE2) in the served cell. The random access preamble may be received from multiple UEs in the served cell, further on donated cell only, each UE having different capabilities e.g. UE1 may be monitoring a different control channel than UE2. Thus, the network node may receive a random access preamble (MSG1) from UE1 that monitors a PDCCH, and a random access preamble (MSG1) from UE2 that monitors an ePDCCH. The random access request preamble may be received on a PRACH. The network node then returns a random access response (MSG2) with control info to the UEs. This may be done on separate control channels respectively i.e. on PDCCH for UE1 and on ePDCCH for UE2. Typically the control information is separated from each other but the data is sent to both UEs (UE1, UE2) using the same PDSCH resources in a random access response (MSG2'). ACK/NACK procedures are not illustrated in FIG. 11 for reason of simplicity.

Referring back to the method illustrated by FIG. 13, the network node may also include determining S131 whether the UE has indicated that the UE is configured to monitor transmissions on the CCH or on the eCCH based on the received UE indication. The network node then transmits S132 the response to the RA preamble using the CCH when determining that the UE has indicated that the UE is configured to monitor transmissions on the CCH, and transmit S132 a response to the RA preamble using the eCCH when determining that the UE has indicated that it monitors transmissions on the eCCH. The action/step of determining S131 is marked with dashed lines in FIG. 13 to clearly indicate that it is an optional action illustrating another/additional parts of the method. This is also in illustrated by FIG. 12.

Figure 12:
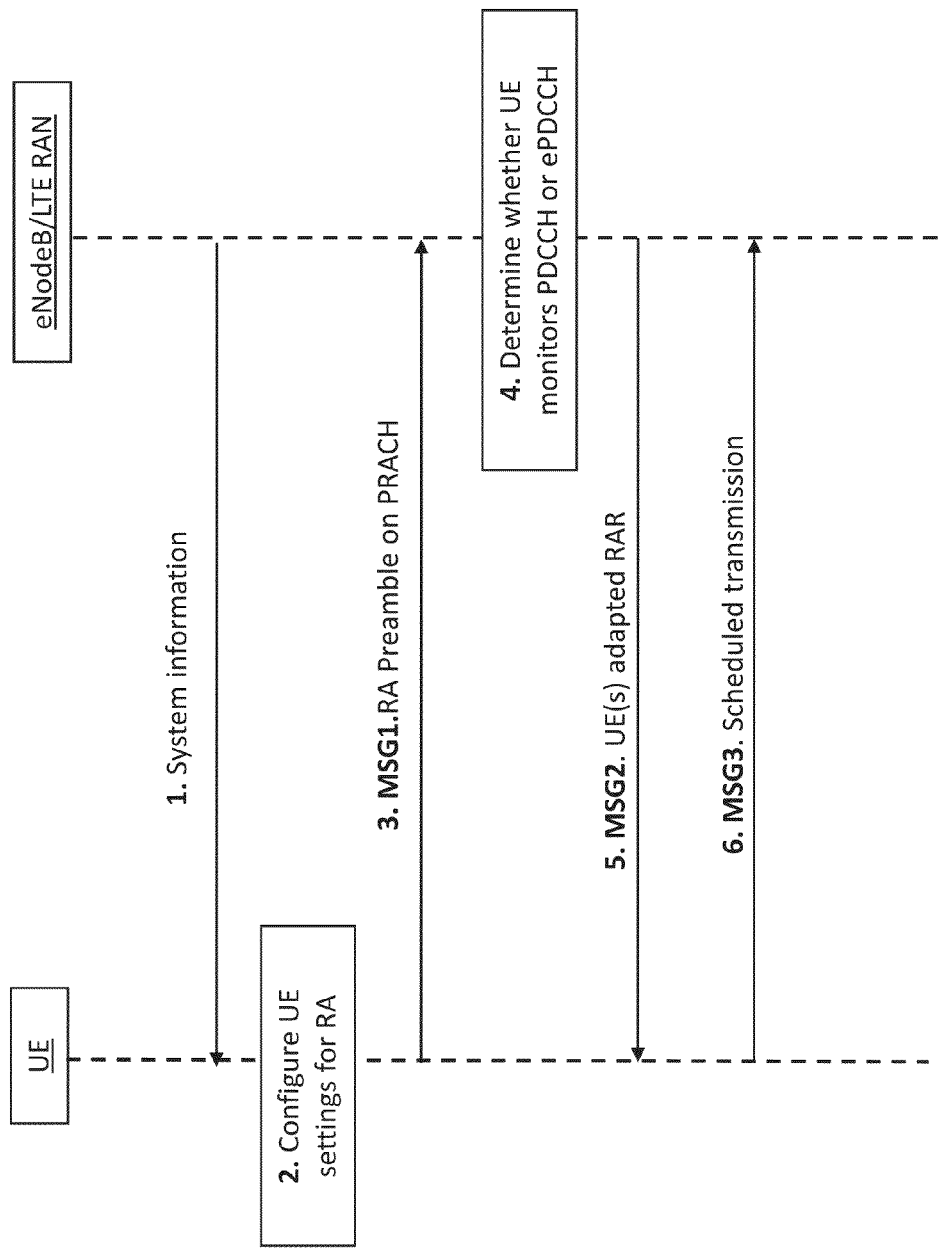
FIG. 12 is an illustration of a signalling scheme for random access procedure according to example embodiments and aspects.

FIG. 12 is an illustration of a signalling scheme for RA procedure according to example embodiments and aspects. According to FIG. 12 the network node transmits (Step 1) a system information message to one or more UEs in served cell(s). This message may be broadcasted to all UEs. One example of such broadcast is by including the message in a Physical Broadcast CHannel (PBCH) containing the Master Information Block (MIB). One example of another broadcast channel that may come into use is for example an enhanced PBCH (ePBCH), which is a broadcast channel that do not rely on CRS for demodulation but rather DMRS, or antenna port 7-14. The system information message may comprise a request requesting the UE(s) to indicate which of the CCH or the eCCH the UE is configured to monitor scheduling of a random access response transmission on. The system information message may also be transmitted to neighbouring network nodes, using X2 interface or other, enabling the neighbouring nodes to provide the system information message to UEs during a handover procedure from a neighbouring network node to the network node. For a UE that is instructed to handover (HO) to another cell, the originating cell provides information, for instance by UE specific RRC signalling, of the reserved preamble(s) or time/frequency RA resource(s) on the target cell i.e. the cell to be handed over to. This is particularly important for UEs that has problems to acquire system information in the target cell due to high interference. An example of such a scenario is the case of large cell range expansion in heterogeneous networks.

Following above, a UE that initially is accessing the wireless communications network, the UE needs for example to know the preambles and/or the time/frequency resources reserved for UEs monitoring PDCCH or ePDCCH respectively. This is accomplished by a procedure where the UE gets and reads system information via a system information message transmitted to the UEs. The system information message may either use information in a Master Information Block (MIB) or in a System Information Block (SIB) to indicate the information.

Alternatively to the above, a new special SIB may be introduced e.g., SIB14, that contains information for such "specially" reserved preambles or time/freq RA resources. Further it is possible to make a critical extension to one of the current available SIB to indicate this information.

Referring back to FIG. 12, wherein system information provides the RA resources for UEs that monitor PDCCH and ePDCCH respectively, the UE receives the system information in a system information message and reconfigures (Step 2) its settings for RA. The UE then transmits (Step 3) RACH MSG1 and the wireless communications network, i.e. network node, may then determine (Step 4) which control channel (CCH) resource(s) the UE is monitoring. A RACH MSG2, adapted RAR, may then be transmitted (Step 5) where a location of the scheduling message is based on a determined resource(s) (PDCCH or ePDCCH) and in the case the network decides to re-schedule the MSG3 response from the UE(s), it may also use the determined resource, PDCCH or ePDCCH region, for the location of the scheduling message that schedules the MSG3 transmission on the PUSCH. The UE may then schedule (Step 6) transmissions on the determined resource (PDCCH or ePDCCH), based on information of which resource that is monitored by the UE.

According to exemplary embodiments, the UE indication may be based on a use of any one or more of: reserved preambles sequences or reserved time-frequency resources. Since the network has problem knowing where the UE is monitoring the RA-RNTI, this may be resolved by using a reserved set of RA resources for contention based random access. Which resource is used informs the network about the monitored resources, if it is in PDCCH or ePDCCH. These may be:

Case 1. Reserved preambles and/or
Case 2. Reserved Time-frequency resources

In Case 1, multiple subsets of available 64 preamble sequences are defined and are signalled as part of the system information. At least one subset is used for UEs that monitor RA-RNTI in the ePDCCH whereas at least one subset, which is different from the first subset, is used for UEs that monitor the RA-RNTI in the PDCCH.

When performing contention based random access, the network node may thus distinguish where the UE is monitoring the RA-RNTI and may thus transmit RACH MSG2 in a correct search space.

In Case 2, different time/frequency regions for the PRACH transmissions may be assigned to UEs that monitor PDCCH or ePDCCH respectively. This may be a standard pre-configuration of PRACH resources used by UEs that monitors RA-RNTI on ePDCCH, potentially known as enhanced PRACH (ePRACH) which distinguish them from PRACH resources for legacy UEs and UEs that monitors RA-RNTI on PDCCH. The use of the additional PRACH resources used by UEs that monitors RA-RNTI on ePDCCH may also be signalled, e.g. upon initial configuration/synchronization. One way to perform such signalling is to use information bits in the MIB.

In a further/alternative embodiment, Case 1 and Case 2 may also be combined. The number of preambles corresponding to ePDCCH usage does not have to be necessarily 64. It may for instance be increased to 96 or 128 or any other number larger than 64.

Figure 14:
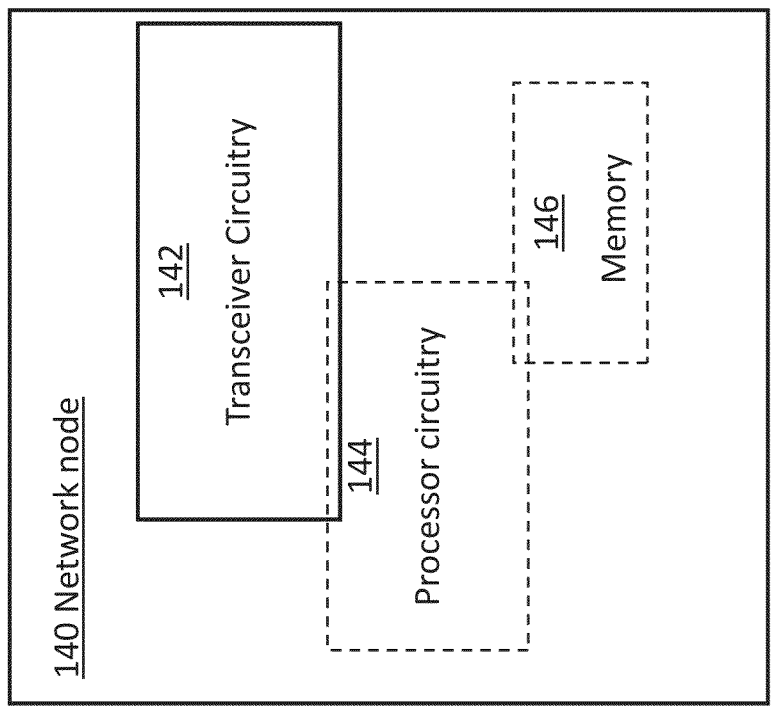
FIG. 14 is a schematic block diagram illustrating embodiments of an exemplary network node.

An example of embodiment of a network node is illustrated by FIG. 14, which is a schematic block diagram illustrating embodiments of the exemplary network node 140. The network node 140 is, as mentioned earlier, for handling of RA procedures providing access to UEs to a wireless communications network. The network node 140 is configured to support both transmissions on the CCH and on the eCCH. The network node 140 comprises a transceiver circuitry 142 configured to receive a RA preamble from at least one UE in the wireless communications network, and to transmit a RA response, in response to the received, RA preamble using at least one of the CCH or the eCCH enabling the UE to monitor the transmissions from the network node 140. The RA preamble comprises a UE indication indicating that the at least one UE is configured to monitor transmissions on the CCH, on the eCCH or on both. The network node 140 may further comprise a processor circuitry 144 and a memory 146, among other parts not disclosed here for simplicity. The mentioned transceiver circuitry 142 and processor circuitry may be configured to perform any of the method earlier mentioned actions/steps.

For example the transceiver circuitry 142 may be configured to transmit a response to the random access preamble using both the CCH and the eCCH. The processor circuitry 144 may be configured to determine whether the UE has indicated that the UE is configured to monitor transmissions on the CCH or on the eCCH based on the received UE indication, and wherein the transceiver circuitry 142 may be configured to transmit a response to the random access preamble using the CCH, when determining that the UE has indicated that the UE is configured to monitor transmissions on the CCH. The transceiver circuitry 142 may also be configured to transmit a response to the random access preamble using the eCCH, when determining that the UE has indicated that the UE is configured to monitor transmissions on the eCCH. The transceiver circuitry 142 may be configured to transmit a system information message to the UE informing the UE of supported transmissions on the CCH and the eCCH, and/or transmit a system information message to the UE comprising a request requesting the UE to indicate which of the CCH or the eCCH the UE is configured to monitor transmission on. Additionally/alternatively, the transceiver circuitry 142 may be configured to transmit a system information message to neighbouring network nodes enabling the neighbouring nodes to provide the system information message to UEs during a handover procedure from a neighbouring network node to the network node. The transceiver circuitry 142 may also be configured to transmit a response to the RA preamble using at least one of the CCH or the eCCH, based on the received UE indication indicating which of the CCH and the eCCH the UE monitors. The boxes (144, 146) are dashed in purpose to indicate that they may be parts of the network node transceiver circuitry 142 or interacting parts not always needed to be as separate physical entities. The transceiver circuitry 142 may comprise one or more receivers, transmitters, antenna(s), antenna port(s) etc. the UE 150 may comprise several other parts not disclosed here for simplicity such as display, keypad, antenna(s), antenna ports etc. The processor circuitry 144 may be/comprise one or more Central Processor/Processing Unit(s) (CPUs).

Figure 15:
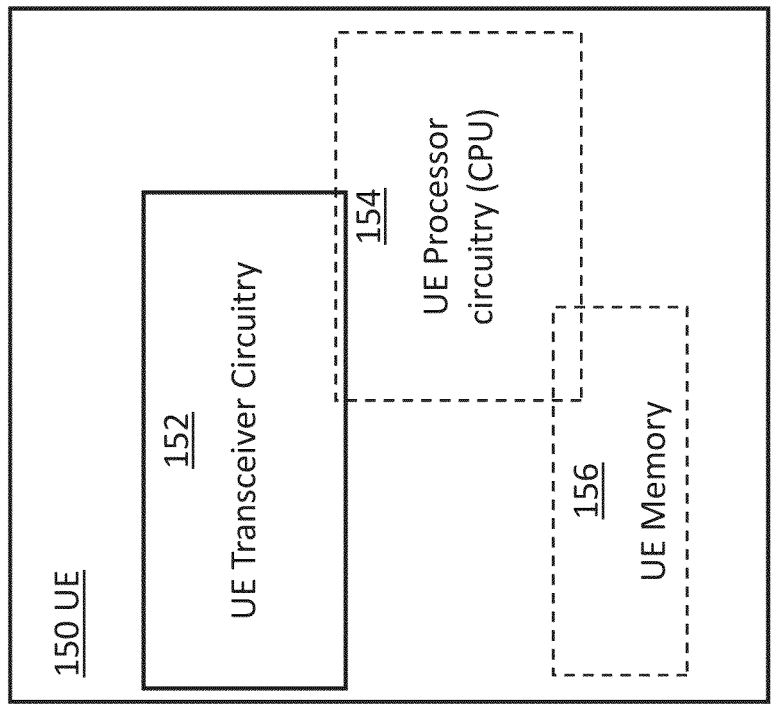
FIG. 15 is a schematic block diagram illustrating embodiments of an exemplary user equipment.

An example of embodiment of a UE is illustrated by FIG. 15, which is a schematic block diagram illustrating embodiments of the exemplary network node 150. The UE 150 being configured for handling RA procedure(s) to a wireless communications network via the network node 140. The UE 150 being further configured to support transmissions on a CCH, on an eCCH, or on both. The UE 150 comprises a UE transceiver circuitry 152 configured to send a RA preamble to the network node 150, and receive a response to the sent RA preamble on at least one of the CCH or the eCCH. The RA preamble comprises an UE indication indicating that the UE is configured to monitor transmissions on the CCH, on the eCCH or on both.

As for the network node 140, the UE 150 and its parts are configured to perform method actions/steps in the UE according to earlier embodiments and aspects.

For example the UE transceiver circuitry 152 may be configured to receive a random access response from the network node 140 on the CCH and the eCCH, and/or receive a system information message from the network node 140. The UE processor circuitry 154 may be configured to determine whether the received system information message includes information of supported network node transmissions on the CCH and on the eCCH.

The UE 150 may also include means/circuitry for indicating UE configuration e.g. by using the UE indication and based on a use of any one or more of: reserved preambles sequences or reserved time-frequency resources. The indication may also be made by aid of the UE transceiver circuitry 152 or the UE processor circuitry 154. The UE 150 may also comprise a UE memory 156 for storing timers and other configurations. The boxes (154, 156) are dashed in purpose to indicate that they may be parts of the UE transceiver circuitry 152 or interacting parts not always needed to be as separate physical entities. The UE 150 may comprise several other parts not disclosed here for simplicity such as display, keypad, antenna(s), antenna ports etc.

The UE transceiver circuitry 152 according to any of the above embodiments may be configured to retrieve, or receive from the network node 140, one or more timers each indicating a time period for which the UE should monitor the CCH or the eCCH and when to switch monitoring from one of the monitored CCH and eCCH to the other one. The timers may also be preconfigured in the UE 150 and stored in the memory 156, or downloaded upon request/initiation.

One implementation or example of the above would be that a UE 150 monitoring for example the ePDCCH momentarily falls back to monitor RA-RNTI, or the whole search space or the common search space only, in PDCCH after it has transmitted RACH MSG1 or a predefined time set by a timer after transmitting RACH MSG1. The UE 150 may also fallback to monitor the RA-RNTI in PDCCH temporarily instead of monitoring the Common Search Space (CSS) in ePDCCH. The UE 150 then returns to monitoring CSS in the ePDCCH after some pre-defined or configured timer has expired and/or after the UE has completed a RACH procedure.

The UE 150 may further monitor TC-RNTI in the CSS temporally in PDCCH. A triggering event to stop monitoring the CSS in PDCCH may for example be reception of MSG2, reception of MSG4, acknowledgement of MSG4. The triggering event may also be different for contention based and contention free RA. As for contention free RA the triggering event to stop monitoring the CSS in PDCCH may be reception of MSG2, while for contention based RA it could be for example reception of MSG 4 or acknowledgement of MSG4. This may also be combined with a timer that indicates if the RA procedure fails. In case RA fails, the UE 150 will either declare radio link failure, or revert to monitor ePDCCH CSS.

Figure 16:
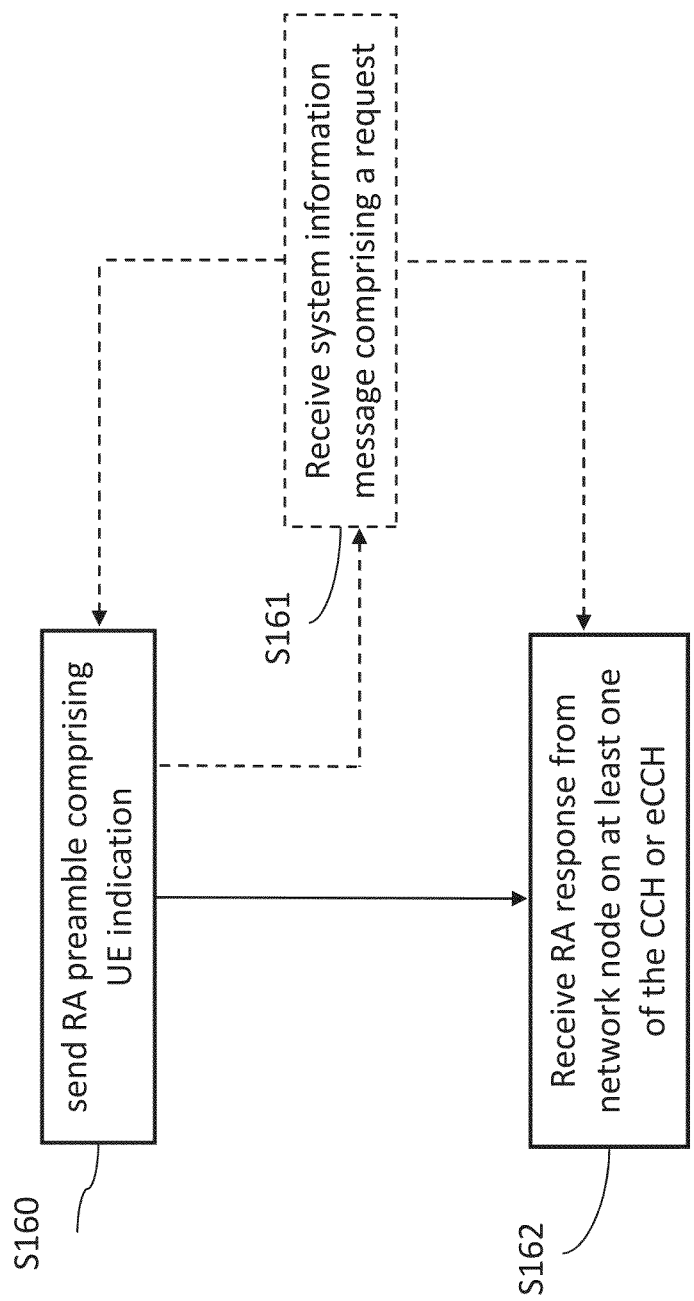
FIG. 16 is a flowchart showing basic acts or steps of an exemplary random access procedure from a user equipment perspective.

FIG. 16 is a flowchart showing basic acts or steps of an exemplary RA procedure from a user equipment perspective such as the UE 150 mentioned earlier in relation to any of FIG. 11 to FIG. 15. The method in the UE 150 is for handling of the RA procedure to a wireless communications network via a network node, such as the network node 140. The UE 150 as mentioned earlier supports transmissions on a CCH, on an eCCH, or on both e.g. compatible with both LTE and enhanced LTE. The method comprises sending S160 a RA preamble/request to the network node 140, the random access preamble comprising a UE indication indicating that the UE is configured to monitor transmissions on the CCH, on the eCCH or on both. The method also comprises receiving S162 a RA response from the network node 140 in response the RA preamble/request on at least one of the CCH or the eCCH enabling the UE 150 to monitor the transmissions from the network node 140. From the UE side, the UE 150 may receive a RA response on the CCH or on the eCCH, or on the indicated channel based on the UE indication. The RA response performed from network node side may also comprise a scheduling of same downlink assignments for resources for both CCH and eCCH.

Referring back to FIG. 16, as illustrated the method in a UE may comprise receiving S161 a system information message, from the network node 140, informing of supported network node transmissions on the CCH and on the eCCH. The system information message may be received from the network node 140 or from a target neighbour network node to which the UE is handed over to or to be handed over to. The system information message may also comprise a request requesting the UE to indicate which of the CCH or the eCCH the UE is configured to monitor transmission on. The system information message may be received by the UE during the RA procedure i.e. upon demand or sent out from the network node at an instant before the UE RA procedure e.g. periodically broadcasted or upon request from another node such as the neighbouring network node etc. Since the UE indication may be an implicit procedure wherein the UE 150 may use one or more reserved preambles sequences or reserved time-frequency resources as to indicate its capabilities, the system information message may thus fit in at any time of the procedure and is thereby marked with dashed lines in FIG. 16.

The method in a UE may also comprise receiving/retrieving one or more timers each indicating a time period for which the UE should monitor the CCH or the eCCH and when to switch monitoring from one of the monitored CCH and eCCH to the other one, not shown in FIG. 16. The retrieving may be done internally from storage means, e.g. memory 156, or from another network node.

Further, it is to be noted that some of the described circuitries (142, 144, 152, 154) may comprise/be circuits/circuitries and are to be regarded as separate logical entities but not with necessity separate physical entities.

The methods in FIG. 13 and FIG. 16 for use in a network node (140) and in a UE (150) may further be implemented through one or more processor circuitry/circuits/circuitries together with computer program code for performing the functions of the present method(s). Thus a computer program product, comprising instructions for performing the method(s) may assist, when the computer program product is loaded into or run in the network node (140) or in the UE (150). The computer program product mentioned above may be provided for instance in the form of a data carrier carrying computer program code for performing the method(s). The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server or in a (radio) network node and downloadable to the network node (140) and to the UE (150) remotely, e.g. over an Internet or an intranet connection.

Although the description above contains many specifics, these should not be construed as limiting a scope of technology disclosed herein but as merely providing illustrations of some of presently preferred embodiments. It will be appreciated that the scope hereof fully encompasses other embodiments which may become obvious to those skilled in the art, and that the scope is accordingly not to be limited.

Reference to an element in the singular is not intended to mean "one and only one" unless explicitly so stated, but rather "one or more".

All structural and functional equivalents to the elements of the above-described embodiments that are known to those of ordinary skill in the art are expressly incorporated herein by reference and are intended to be encompassed hereby.

When using the word "comprise" or "comprising" it shall be interpreted as non-limiting, i.e. meaning "consist at least of". The term configured to may be equally exchangeable with being adapted to and is considered to have the same meaning. Various alternatives, modifications and equivalents may be used. Therefore, the above embodiments are not to be taken as limiting the scope of the present invention, which is defined by the appending claims.

The invention claimed is:

1. A method in a network node for handling random access procedures that provide User Equipments (UEs) access to a wireless communications network via the network node, wherein the network node supports both transmissions on a Control CHannel (CCH) and on an enhanced Control CHannel (eCCH), and the method comprises:
    receiving a random access preamble from a UE in the wireless communications network, the random access preamble comprising a UE indication indicating whether the UE is configured to monitor transmissions on the CCH, on the eCCH, or on both; and
    transmitting a random access response to the UE on at least one of the CCH and the eCCH, based on the received UE indication.

2. The method according to claim 1, wherein transmitting the random access response comprises transmitting the random access response to the UE on both the CCH and the eCCH.

3. The method according to claim 2, wherein the random access response schedules the same downlink assignments for resources for both the CCH and eCCH.

4. The method according to claim 1, wherein transmitting the random access response comprises:
    determining whether the UE has indicated that the UE is configured to monitor transmissions on the CCH or on the eCCH based on the received UE indication;
    transmitting the random access response to the UE on the CCH, based on determining that the UE has indicated that the UE is configured to monitor transmissions on the CCH; and
    transmitting the random access response to the UE on the eCCH, based on determining that the UE has indicated that it monitors transmissions on the eCCH.

5. The method according claim 1, wherein the method comprises transmitting a system information message to the UE, informing the UE of supported transmissions on the CCH and the eCCH.

6. The method according to claim 5, wherein the method comprises transmitting the system information message to neighbouring network nodes, enabling the neighbouring nodes to provide the system information message to UEs during a handover procedure from one of the neighbouring network nodes to the network node.

7. The method according to claim 1, wherein the method comprises transmitting a system information message to the UE comprising a request requesting the UE to indicate which of the CCH or the eCCH the UE is configured to monitor transmissions on.

8. The method according to claim 1, wherein the UE indication is based on a use of any one or more of: reserved preambles sequences and reserved time-frequency resources.

9. The method according to claim 1, wherein the CCH is a Physical Downlink Control CHannel (PDCCH) and the eCCH is an enhanced PDCCH (ePDCCH).

10. The method according to claim 1, further comprising transmitting a system information message that indicates first random access resources reserved for UEs that monitor the CCH and second random access resources reserved for UEs that monitor the eCCH, and wherein receiving the random access preamble from the UE comprises receiving the random access preamble via the first or second random access resources, and wherein the method further comprises determining the UE indication according to whether the UE used the first or the second random access resources to send the random access preamble.

11. The method of claim 10, further comprising sending the system information message to a neighbouring network node, thereby enabling the neighbouring network node to inform UEs being handed over to the network node of the first and second random access resources reserved by the network node.

12. A network node for handling of random access procedures providing User Equipments (UEs) access to a wireless communications network via the network node, wherein the network node is configured to support both transmissions on a control channel (CCH) and on an enhanced control channel (eCCH), and comprises transceiver circuitry configured to:
receive a random access preamble from a UE in the wireless communications network, the random access preamble comprising a UE indication indicating that the UE is configured to monitor transmissions on the CCH, on the eCCH, or on both; and
transmit a random access response to the UE on at least one of the CCH and the eCCH, based on the received UE indication.

13. The network node according to claim 12, wherein the transceiver circuitry is configured to transmit the random access response to the UE on both the CCH and the eCCH.

14. The network node according to claim 13, wherein the random access response schedules the same downlink assignments for resources for both the CCH and eCCH.

15. The network node according to claim 12, wherein the network node comprises processor circuitry configured to determine whether the UE has indicated that the UE is configured to monitor transmissions on the CCH or on the eCCH, based on the received UE indication, and wherein the transceiver circuitry is configured to:
transmit the random access response to the UE on the CCH, based on determining that the UE has indicated that the UE is configured to monitor transmissions on the CCH; or,
transmit the random access response to the UE on the eCCH, based on determining that the UE has indicated that the UE is configured to monitor transmissions on the eCCH.

16. The network node according to claim 12, wherein the transceiver circuitry is configured to transmit a system information message to the UE, informing the UE of supported transmissions on the CCH and the eCCH.

17. The network node according to claim 12, wherein the transceiver circuitry is configured to transmit a system information message to the UE comprising a request requesting the UE to indicate which of the CCH and the eCCH the UE is configured to monitor transmission on.

18. The network node according to claim 16, wherein the transceiver circuitry is configured to transmit the system information message to neighbouring network nodes, enabling the neighbouring nodes to provide the system information message to UEs during a handover procedure from one of the neighbouring network nodes to the network node.

19. The network node according to claim 12, wherein the CCH is a Physical Downlink Control CHannel (PDCCH) and the eCCH is an enhanced PDCCH (ePDCCH).

20. The network node according to claim 12, wherein the transceiver circuitry is configured to transmit a system information message that indicates first random access resources reserved for UEs that monitor the CCH and second random access resources reserved for UEs that monitor the eCCH, and wherein the network node receives the random access preamble from the UE via the first or second random access resources, and further wherein the transceiver circuitry is configured to determine the UE indication according to whether the UE used the first or the second random access resources to send the random access preamble.

21. The network node of claim 20, wherein the transceiver circuitry is configured to send the system information message to a neighbouring network node, thereby enabling the neighboring network node to inform UEs being handed over to the network node of the first and second random access resources reserved by the network node.

22. A method in a User Equipment (UE) for handling random access procedures to a wireless communications network via a network node, wherein the UE supports transmissions on a Control CHannel (CCH), or on an enhanced Control CHannel (eCCH), or on both, and wherein the method comprises:
sending a random access preamble to the network node, the random access preamble comprising a UE indication indicating that the UE is configured to monitor transmissions on the CCH, on the eCCH, or on both; and
receiving a random access response from the network node on at least one of the CCH or the eCCH, enabling the UE to monitor the transmissions.

23. The method according to claim 22 wherein the receiving comprises receiving a random access response from the network node on both the CCH and the eCCH.

24. The method according to claim 23, wherein the random access response schedules the same downlink assignments for resources for both CCH and eCCH.

25. The method according to claim 22, wherein the sending is performed upon receiving a system information message from the network node, informing the UE of supported network node transmissions on the CCH and on the eCCH.

26. The method according to claim 22, wherein the method further comprises receiving a system information message from the network node, or from a target neighbour node to which the UE is handed over to, said system information message comprising a request requesting the UE to indicate which of the CCH and the eCCH the UE is configured to monitor transmissions on.

27. The method according to claim 22, wherein the UE indication is based on a use of any one or more of: reserved preambles sequences and reserved time-frequency resources.

28. The method according to claim 22, wherein the CCH is a Physical Downlink Control CHannel (PDCCH) and the eCCH is an enhanced PDCCH (ePDCCH).

29. The method according to claim 22, wherein the receiving comprises receiving one or more timers, each indicating a time period for which the UE should monitor the CCH or the eCCH and when to switch monitoring from one of the monitored CCH and eCCH to the other one.

30. The method according to claim 22, further comprising receiving a system information message that indicates first random access resources reserved by the network node for UEs that monitor the CCH and indicates second random access resources reserved by the network node for UEs that monitor the eCCH, and wherein sending the random access preamble to the network node comprises one of:
sending the random access preamble using the first random access resources, to thereby indicate that the UE monitors the CCH; and
sending the random access preamble using the second random access resources, to thereby indicate that the UE monitors the eCCH.

31. A User Equipment (UE) configured for handling a random access procedure to a wireless communications network via a network node, wherein the UE is configured to support transmissions on a Control CHannel (CCH), or on an enhanced Control CHannel (eCCH), or on both, and further wherein the UE comprises transceiver circuitry configured to:
send a random access preamble to the network node, the random access preamble comprising a UE indication indicating that the UE is configured to monitor transmissions on the CCH, on the eCCH or on both; and,
receive a random access response from the network node, on at least one of the CCH or the eCCH, enabling the UE to monitor the transmissions.

32. The UE according to claim 31, wherein the transceiver circuitry is configured to receive a random access response from the network node, on both the CCH and the eCCH.

33. The UE according to claim 31, wherein the transceiver circuitry is configured to receive a system information message from the network node, and wherein the UE comprises a processor circuitry configured to determine whether the received system information message includes information indicating supported network node transmissions on the CCH and on the eCCH.

34. The UE according to claim 31, wherein the UE indication indicates the UE configuration and is based on a use by the UE of any one or more of: reserved preambles sequences or reserved time-frequency resources.

35. The UE according to claim 31, wherein the transceiver circuitry is configured to retrieve, or receive from the network node, one or more timers, each indicating a time period for which the UE should monitor the CCH or the eCCH and when to switch monitoring from one of the monitored CCH and eCCH to the other one.

36. The UE according to claim 31, wherein the transceiver circuitry is configured to receive a system information message that indicates first random access resources reserved by the network node for UEs that monitor the CCH and indicates second random access resources reserved by the network node for UEs that monitor the eCCH, and to send the random access preamble to the network node using the first random access resources, to thereby indicate that the UE monitors the CCH, or using the second random access resources, to thereby indicate that the UE monitors the eCCH.

\* \* \* \* \*

UNITED STATES PATENT AND TRADEMARK OFFICE
CERTIFICATE OF CORRECTION

PATENT NO. : 8,995,395 B2  
APPLICATION NO. : 13/581109  
DATED : March 31, 2015  
INVENTOR(S) : Frenne et al.

Page 1 of 1

It is certified that error appears in the above-identified patent and that said Letters Patent is hereby corrected as shown below:

IN THE CLAIMS

In Column 15, Line 1, in Claim 5, delete "according" and insert -- according to --, therefor.

Signed and Sealed this  
Thirteenth Day of October, 2015

Michelle K. Lee  
*Director of the United States Patent and Trademark Office*